(12) United States Patent
Miles (10) Patent No.: US 6,464,245 B1
(45) Date of Patent: Oct. 15, 2002

(54) LUGGAGE CART HANDLE

(76) Inventor: Judy Miles, 20419 Sunny Shores Dr., Humble, TX (US) 77346

( * ) Notice: Subject to any disclaimer, the term of this patent is extended or adjusted under 35 U.S.C. 154(b) by 0 days.

(21) Appl. No.: 09/723,484

(22) Filed: Nov. 28, 2000

(51) Int. Cl.[7] .............................................. B62B 1/00
(52) U.S. Cl. ................... 280/655.1; 280/47.17; 280/47.18; 280/47.34; 280/654; 16/113.1; 16/411; 190/18 A
(58) Field of Search ..................... 280/47.2, 47.17, 280/47.18, 47.26, 47.27, 47.36, 47.37, 47.34, 655, 655.1, 654, 47.315; 16/113.1, 114.1, 443, 444, 429, 439, 405, 408, 411; 190/18 A (56) References Cited

U.S. PATENT DOCUMENTS

| | | | | |
|---|---|---|---|---|
| 2,301,164 A | | 11/1942 | Mall ............................ | 51/177 |
| 3,004,768 A | * | 10/1961 | Klages ........................ | 280/15 |
| 3,663,033 A | * | 5/1972 | Story ....................... | 280/47.17 |
| 3,788,659 A | * | 1/1974 | Allen ........................ | 280/5.24 |
| 3,799,568 A | * | 3/1974 | Hager ........................ | 280/37 |
| 4,029,328 A | | 6/1977 | Herterich et al. | |
| 4,071,922 A | * | 2/1978 | Davies et al. ................. | 16/438 |
| 4,227,710 A | | 10/1980 | Laub ....................... | 280/47.19 |
| 4,256,320 A | * | 3/1981 | Hager ........................ | 280/37 |
| 4,275,894 A | * | 6/1981 | Mortenson ................ | 280/47.29 |
| 4,429,897 A | | 2/1984 | Friedman et al. ........... | 280/646 |
| 4,504,071 A | | 3/1985 | Drummond ................ | 280/5.24 |
| 4,538,709 A | * | 9/1985 | Williams et al. ........... | 190/18 A |
| 4,561,526 A | * | 12/1985 | Winter et al. ................ | 190/115 |
| 4,639,004 A | | 1/1987 | Maeda et al. ............... | 280/5.32 |
| 4,762,333 A | * | 8/1988 | Mortenson ................. | 280/43.1 |
| 5,075,925 A | * | 12/1991 | Maloney ....................... | 16/112 |
| 5,370,409 A | * | 12/1994 | Latouche ................. | 280/47.26 |
| 5,375,277 A | | 12/1994 | Carr et al. ....................... | 5/625 |
| 5,573,089 A | * | 11/1996 | Liang .......................... | 190/115 |
| 5,685,552 A | | 11/1997 | Osaki ....................... | 280/47.24 |
| 5,722,118 A | * | 3/1998 | Hansen et al. ................. | 16/114 |
| 5,884,362 A | * | 3/1999 | Tsai ............................. | 16/115 |
| 5,941,543 A | | 8/1999 | Kazmark, Jr. ............. | 280/47.29 |
| 5,984,327 A | * | 11/1999 | Hsieh et al. ............. | 280/47.24 |

FOREIGN PATENT DOCUMENTS

| | | | | |
|---|---|---|---|---|
| GB | 000138571 A2 | * | 4/1985 | .............. 280/47.17 |
| JP | 405294245 A | * | 11/1993 | .............. 280/47.17 |

* cited by examiner

Primary Examiner—Brian L. Johnson
Assistant Examiner—Kelly E Campbell
(74) Attorney, Agent, or Firm—Conley, Rose & Tayon, P.C.

(57) ABSTRACT

An adaptable luggage cart or suitcase handle that is configured to accommodate an assortment of positions is presented. The adaptable handle includes secondary grip extensions that exist within the contours of a traditionally-shaped luggage cart handle and are capable of attaining a more comfortable, extended grasping position than a traditional handle. The extended position of the convertible handle allows the user to switch from a palms-down or a palms-up grasping position to a palms-inward position that emulates the grip a snow skier makes on a ski pole. Furthermore, once in the extended position, the handle of the present invention can be configured in a wide assortment of extension angles to increase the comfort to the user.

27 Claims, 6 Drawing Sheets

LUGGAGE CART HANDLE

CROSS-REFERENCE TO RELATED APPLICATIONS

Not Applicable.

TECHNICAL FIELD OF THE INVENTION

The present invention relates generally to devices used to transport or tow heavy objects.

More particularly, the present invention relates to a wheeled dolly for transporting heavy objects or luggage. More particularly still, the present invention relates to a convertible handle for a wheeled dolly that is configured to change from a standard position to an alternative position that is more comfortable to the user.

BACKGROUND OF THE INVENTION

Various devices have been used to assist people in transporting objects that are either too heavy or bulky to carry comfortably without assistance. A common example of such device is known to many as a luggage cart or a suitcase dolly. Luggage carts typically include a small frame with a handle and a single pair of parallel wheels. An object to be transported, often a suitcase or file box, is placed upon the frame and held in place, either by straps, elastic cords, or by its own weight. The user then grasps the handle and tilts the cart about the axis of the wheels until a substantial portion of the weight of the object is supported by the wheels. Once in this position, the user is able to pull and maneuver the cart with ease from one location to another. The weight of the object is substantially carried by the pair of wheels which, when coupled to the frame by proper bushings or bearings, enables the user of the luggage cart to transport objects that would otherwise be too difficult or heavy to carry. The single pair of parallel wheels gives the luggage cart increased maneuverability, thus enabling the user to direct their objects through crowded or obstructed areas easily. Luggage carts are preferably designed to be collapsed into a reduced profile so as to enable the user to more easily transport the device. Typically, the frame folds together while the handle apparatus collapses, often telescopically, into a shortened position. Once compacted, the luggage cart is capable of being easily transported, often taking up little more space than a portable computer.

Frequently, containers that are expected to transport relatively heavy objects are manufactured with a cart of this type integral to the container design. A common example of a container of this design is the "traveler" design suitcase. Such a case includes a set of integrated wheels at its bottom and a retractable handle at its top. Once a traveler reaches his or her destination, they are then able to extend the handle, tilt the suitcase about the axis of the integral wheels, and transport the case by grasping and pulling the handle. Frequently, such a case will include a provision, in the form of hooks or accessory platforms, that enables the attachment of other bags to the wheeled case. This design is a favorite among travelers that must carry more than one bag thus enabling them to transport all of their luggage using a single handled device.

One drawback to the luggage carts and traveler suitcases currently available on the market is the limited amount of comfort they allow the operator. While great advances have been made to increase the durability and compactability of such carts, little has been done to improve their ergonomic characteristics. Particularly, most luggage carts and wheeled suitcases include a handle that is substantially parallel to the axis of rotation about which the wheels rotate. This requires the user to pull the device with their hand in either a palms-up or palms-down position. While such a position for the handle may be acceptable for some users, others find such a position uncomfortable, if not painful, during extended periods of use. A collapsible luggage cart or traveler suitcase with a retractable handle having improved ergonomics than what is currently available would be highly desirable and beneficial to consumers. The present invention addresses the shortcomings of the prior art.

SUMMARY OF THE INVENTION

The present invention overcomes the deficiencies of the prior art by providing an adaptable handle for dollies, luggage carts, and suitcases that is configured to accommodate an assortment of positions. The adaptable handle includes secondary grip extensions that are disposed within the contours of a traditionally-shaped handle and are capable of attaining a more comfortable, extended grasping position than a traditional handle. The extended, or forward-facing, position of the convertible handle allows the user to switch from a palms-up (or palms-down) grasping position to a palms-inward position that emulates the grip a snow skier makes on a ski pole.

Furthermore, once in the extended position, the handle of the present invention can be configured in a wide assortment of extension angles to increase the comfort to the user. The features, above and collectively, provide substantial ergonomic advantages and allow for longer, more comfortable periods of use.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENTS

Figure 1A:
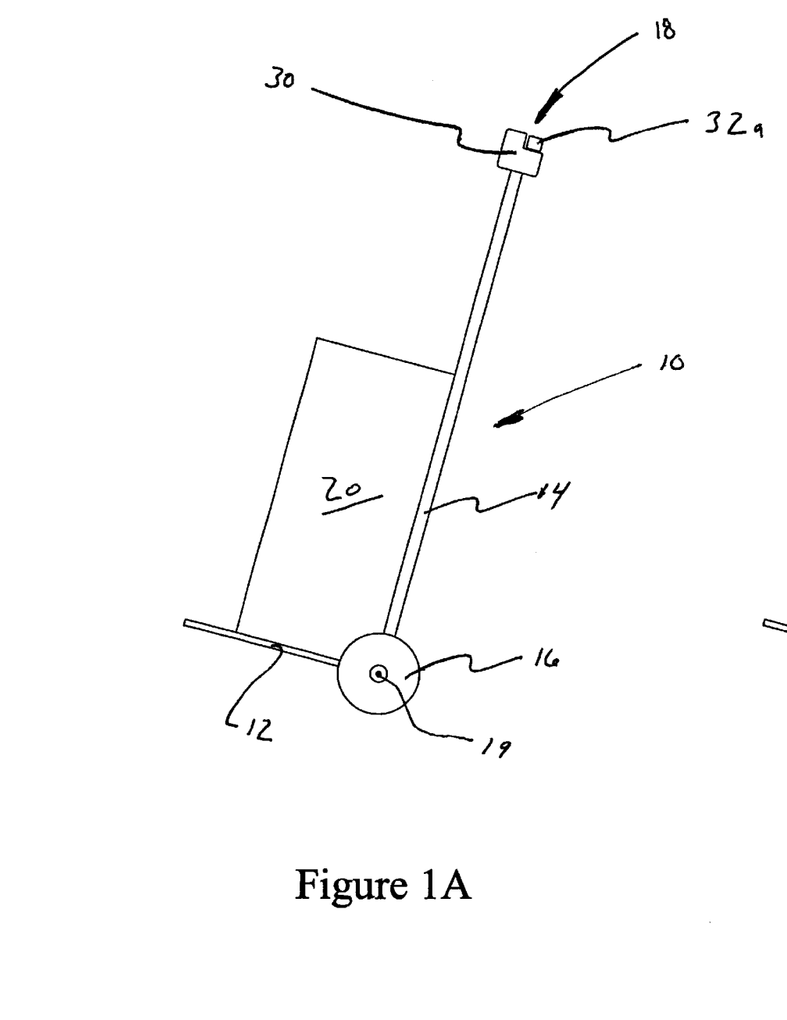
FIG. 1A is a schematic view drawing of a luggage cart assembly with a convertible handle in accordance with a preferred embodiment of the present invention, the handle being disposed in a first configuration.
Figure 1B:
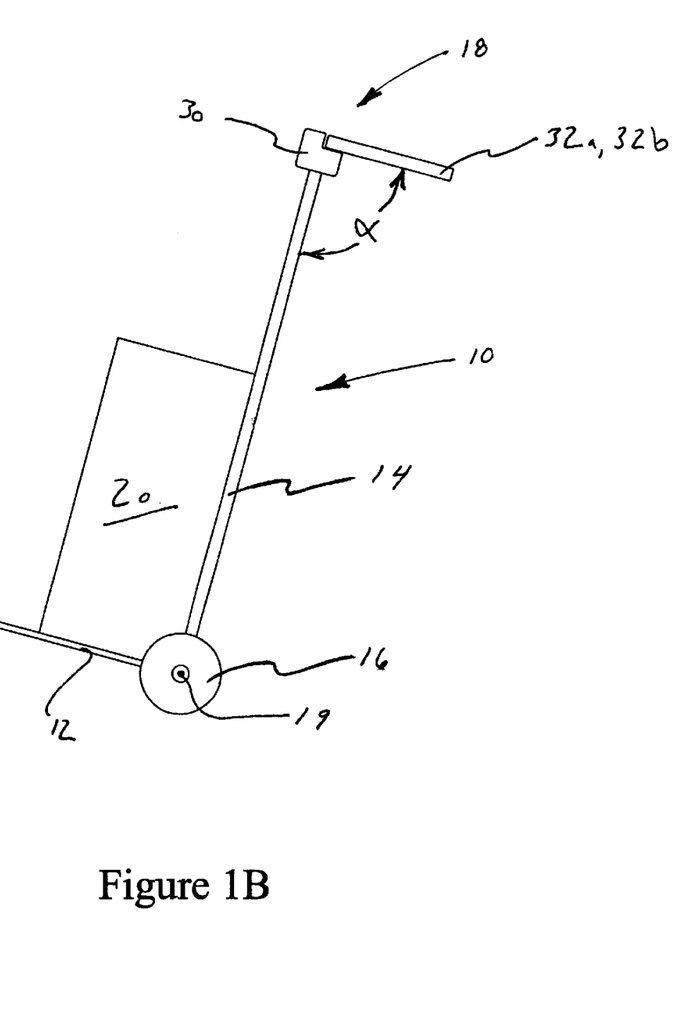
FIG. 1B is a schematic view drawing of the luggage cart assembly of FIG. 1A with the convertible handle in a second, forward-facing configuration.

Referring initially to FIGS. 1A–B, a schematic representation of a luggage cart or transport apparatus 10 is shown. Luggage cart 10 includes a base 12, a back 14, a pair of parallel wheels 16, and a handle 18. It is preferable that base 12 and back 14 meet substantially perpendicular at a line of intersection that defines an axis 19 for wheels 16. A load 20, typically in the form of a box or suitcase, is placed upon base 12 and against back 14 and can be secured with straps or cords (not shown) or any other type of retaining apparatus. If load 20 is heavy enough, straps or another retaining apparatus may not be necessary, the load above providing enough stability to keep it in place.

Handle 18 is constructed as a convertible device and includes a main body 30 and at least one extension grip 32. FIG. 1A shows extension grip 32 in a first position nested within main body 30, while FIG. 1B shows grip 32 in an extended, forward-facing position. In the extended position of FIG. 1B, grip 32 defines an angle of inclination a with back 14. Although angle of inclination a is shown in FIG. 1B as approximately 90°, it should be understood that various angles may be employed. Particularly, handle 18 may be constructed such that angle a between grip 32 and back 14 may be fully adjustable to accommodate the height of the user and other user preferences.

Figures 2A, 2B, 2C:
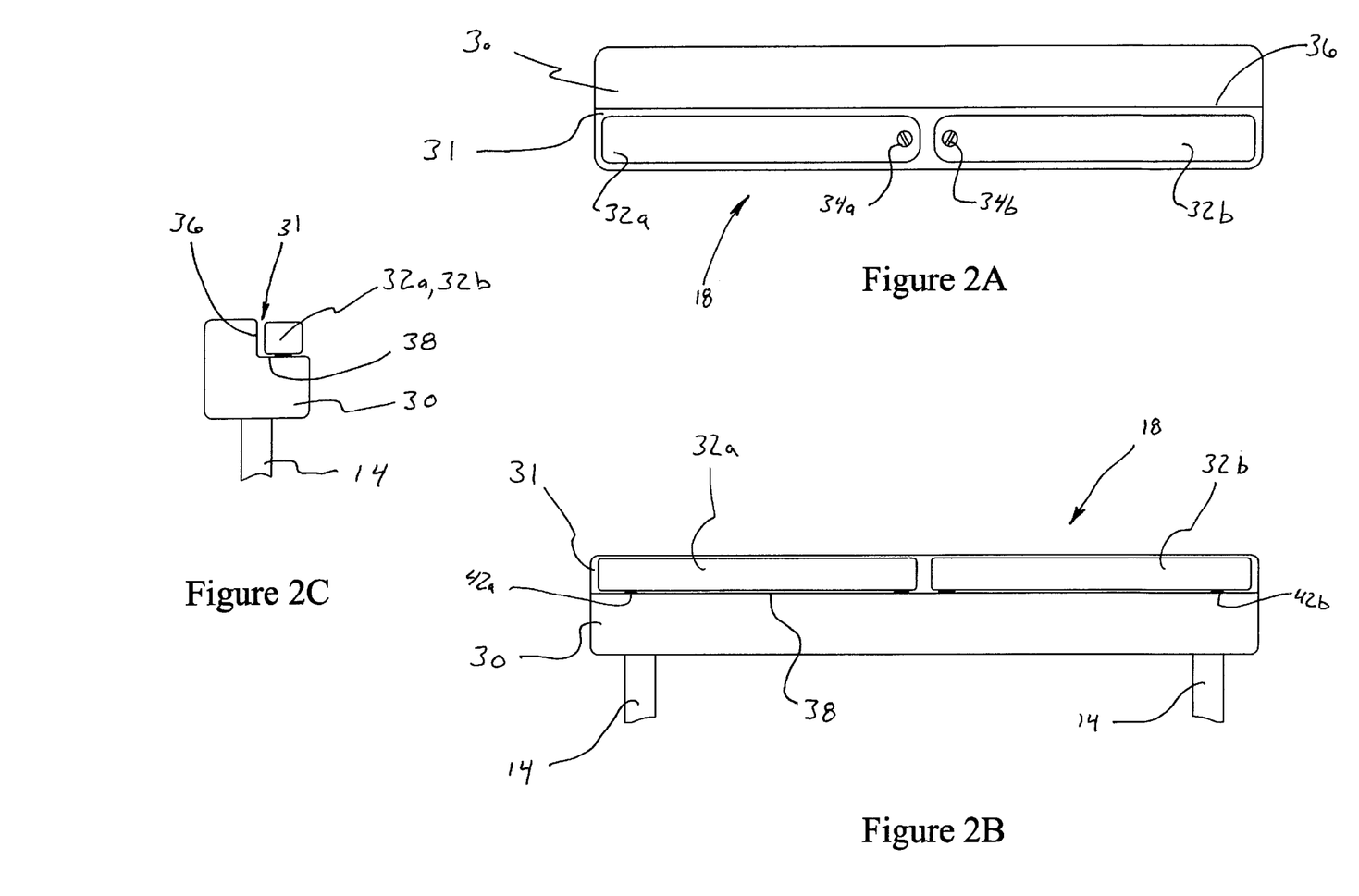
FIG. 2A is a top view schematic drawing of the handle of the luggage cart of FIG. 1A.
FIG. 2B is a front view schematic drawing of the handle of the luggage cart of FIG. 1A.
FIG. 2C is a side view schematic drawing of the handle of the luggage cart of FIG. 1A.

Referring now to FIGS. 2A–C, the handle 18 of transport apparatus 10 is shown in more detail. FIG. 2A, a top view, details handle 18 in a contracted or nested position from a top view and shows main body 30, left and right extension grips 32a, 32b respectively, and pivot screws 34a, 34b. FIG. 2B details the same handle of FIG. 2A in a front view and FIG. 2C details handle 18 from the side. In FIGS. 2B–C, the extensions to the frame 14 of cart 10 can be shown protruding from the bottom of main body 30 of handle 18.

Referring specifically now to FIG. 2C, the cutaway, or recess 31 in main body 30, for containing the nested extensions 32a, 32b can be seen. Recess 31 is formed as a cutout and includes back surface 36 and bottom surface 38. Although handle assembly 18 is shown as primarily square-shaped in FIGS. 1–4, it should be noted that handle 18 can be contoured to any geometry desired by the manufacturer. Examples of such geometries favorable to consumers would include circular cross sections (as shown in FIG. 5) or cross sections molded to replicate the contours of the operator's hand as shown in FIGS. 6A–B.

Referring to FIGS. 2–3 collectively, the operation of handle 18 can be described. In the contracted or nested position (shown in FIGS. 1A, 2A–C), handle 18 is capable of being used as any other luggage cart handle. In this position, the operator grasps handle 18 along its length, tilts cart 10 about the axis 19 of wheels 16, shifting the weight of load 20 over wheels 16, and pulls cart 10 as he or she walks to their destination. While the operator is using cart 10 with handle 18 in the contracted position, the hand used to pull cart 10 is rotated such that its palm is pointed substantially upward or, in some instances, downward. For many users, these positions are not comfortable and can become painful after prolonged use.

Figure 3:
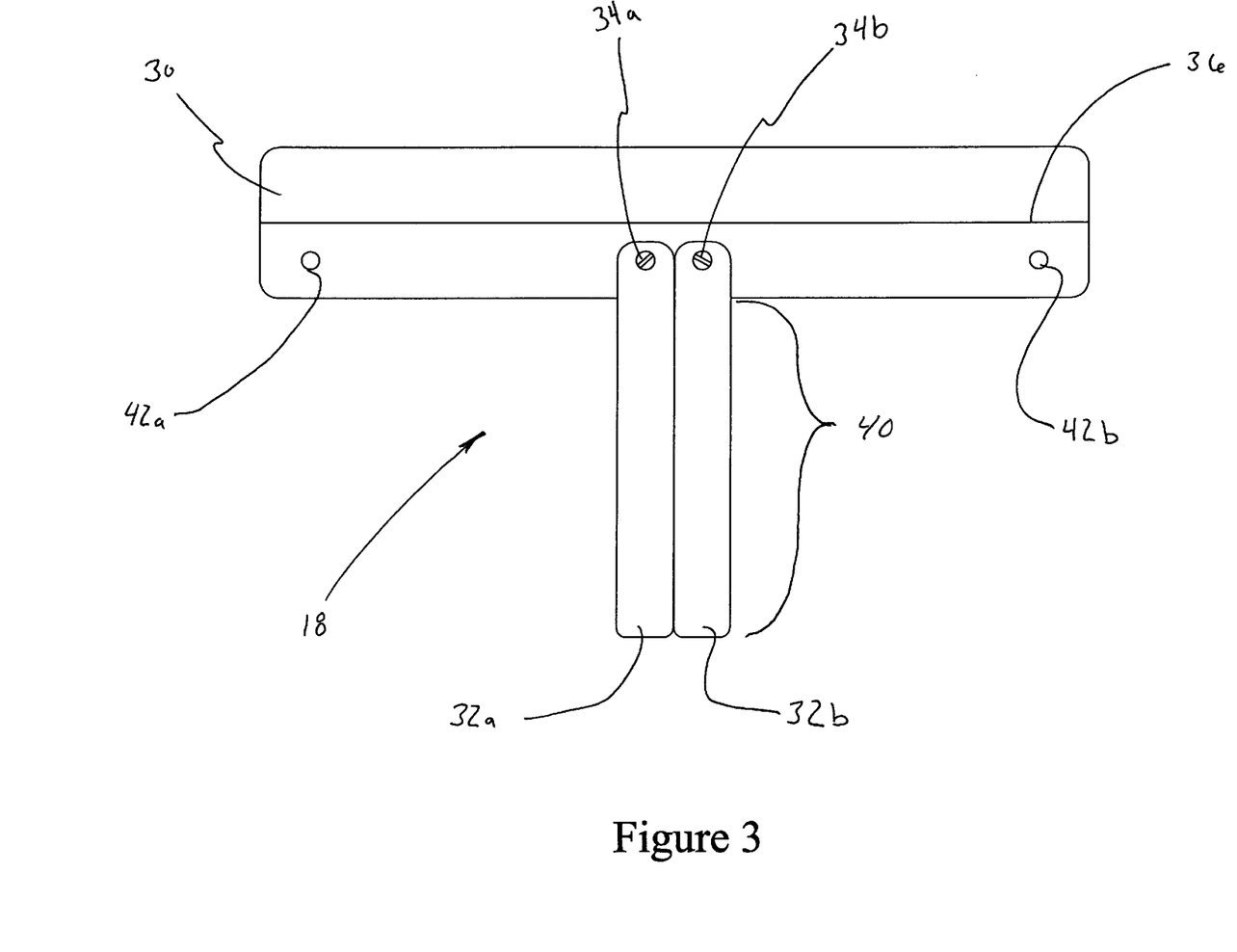
FIG. 3 is a top view schematic drawing of the handle of the luggage cart of FIG. 1B.

To alleviate such discomfort, the operator is able to reconfigure handle 18 into the extended, or forward-facing, position by swinging grips 32a, 32b about their respective pivot points 34a, 34b until the grips meet together as shown in FIG. 1B and FIG. 3. Once in the extended position, the user is now able to grasp the new handle 40, created by the meeting of extensions 32a and 32b, along its length. As before, the user grasps handle 40, tilts cart 10 forward about axis 19 of wheels 16 and pulls cart 10 as he or she walks. In this position, the user's hand is more comfortably placed, preferably with the palm substantially inward and the thumb downward as if gripping a ski thrust pole.

Although a single-axis pivot screw 34a, 34b is shown in FIGS. 2–3, it should be understood that compound, multi-axis pivot devices may be used instead to allow the user to extend extensions 32a, 32b as well as manipulate the extension angle α. Additionally, a wide assortment of devices may be employed upon handle 18 to maintain grips 32a, 32b in a desired angular position a, such that its position will not change as the user tows cart 10. Such devices may include, but are not limited to straps, ratchets, snap in place features (i.e. detent position stops), and viscous or coulombic friction features (i.e. rubber washers to resist repositioning). FIG. 2B and FIG. 3 show detent upsets 42a, 42b upon main body 30 to retain grips 32a, 32b in the retracted position.

Figure 4A:
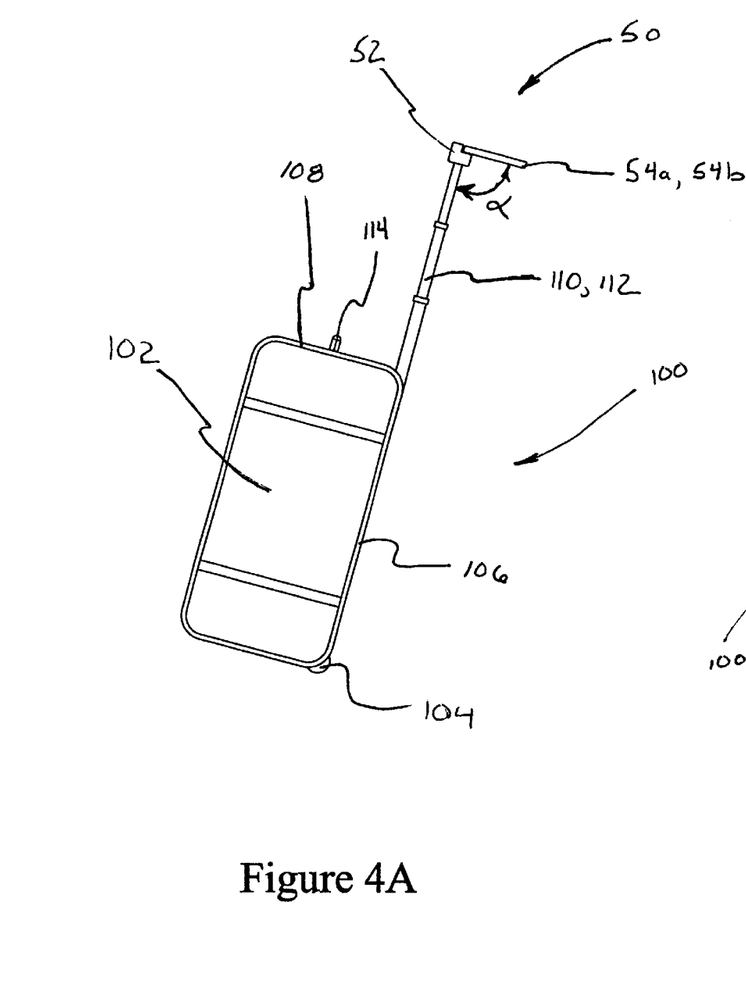
FIG. 4A is a side view schematic drawing of a traveler suitcase having an integral convertible handle in accordance with another preferred embodiment of the present invention, the handle being shown in a second forward-facing configuration.
Figure 4B:
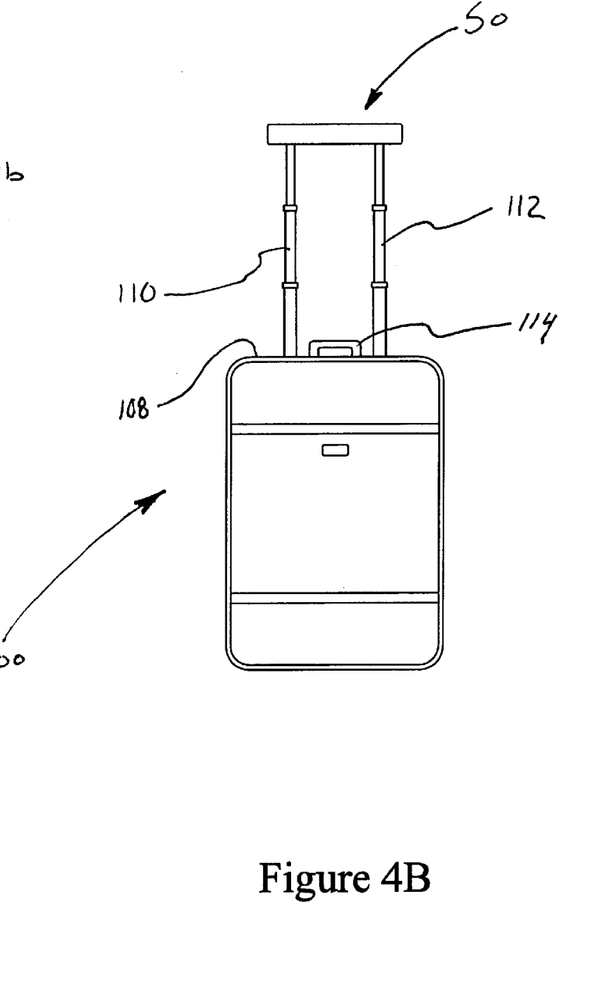
FIG. 4B is a front view schematic of the integral traveler suitcase of FIG. 4B.

Referring now to FIGS. 4A–B a convertible handle 50 is shown attached to an integrated traveler suitcase 100. Traveler suitcase 100 includes a compartment 102, a pair of wheels 104, a back side 106, and a top side 108. Protruding from top side 108 of suitcase 100 are two telescopic extension poles 110, 112 and a lifting handle 114. Telescopic poles 110, 112 are configured to raise and lower away from and towards top 108 of suitcase 100 and to provide a mounting location for convertible handle 50. Convertible handle is constructed in the same manner as handle 18 of FIGS. 1–3 and therefore includes a main body 52 and a pair of extensions 54a, 54b. Unlike dolly 10 of FIGS. 1A–B, there is no exterior frame (14) and base (12) for suitcase 100, as those components are integrated with the suitcase frame within compartment 102. Compartment 102 of suitcase 100 includes all the structural reinforcement along its back side 106 necessary to allow poles 110, 112 to transmit loads from handle 50 to wheels 104.

When convertible handle 50 is desired for transporting suitcase 100, the user simply raises handle 50 through the extension of poles 110, 112 and converts grips 54a, 54b into the desired position as shown in FIG. 4A. As described above, the inclination angle a may be adjusted or preset to accommodate the users preference or may simply be fixed to one position. When handle 50 is no longer needed, grips 54a, 54b are retracted to their nested position within main body 52, and telescopic poles 110, 112 are retracted, allowing handle 50 to be retracted within a recess (not shown) formed within back 106 and top 108 sides of suitcase 100. With handle 50 fully retracted, lifting handle 114 may be used for simple positioning and lifting.

Figures 5A, 5B, 5C, 5D, 5E:
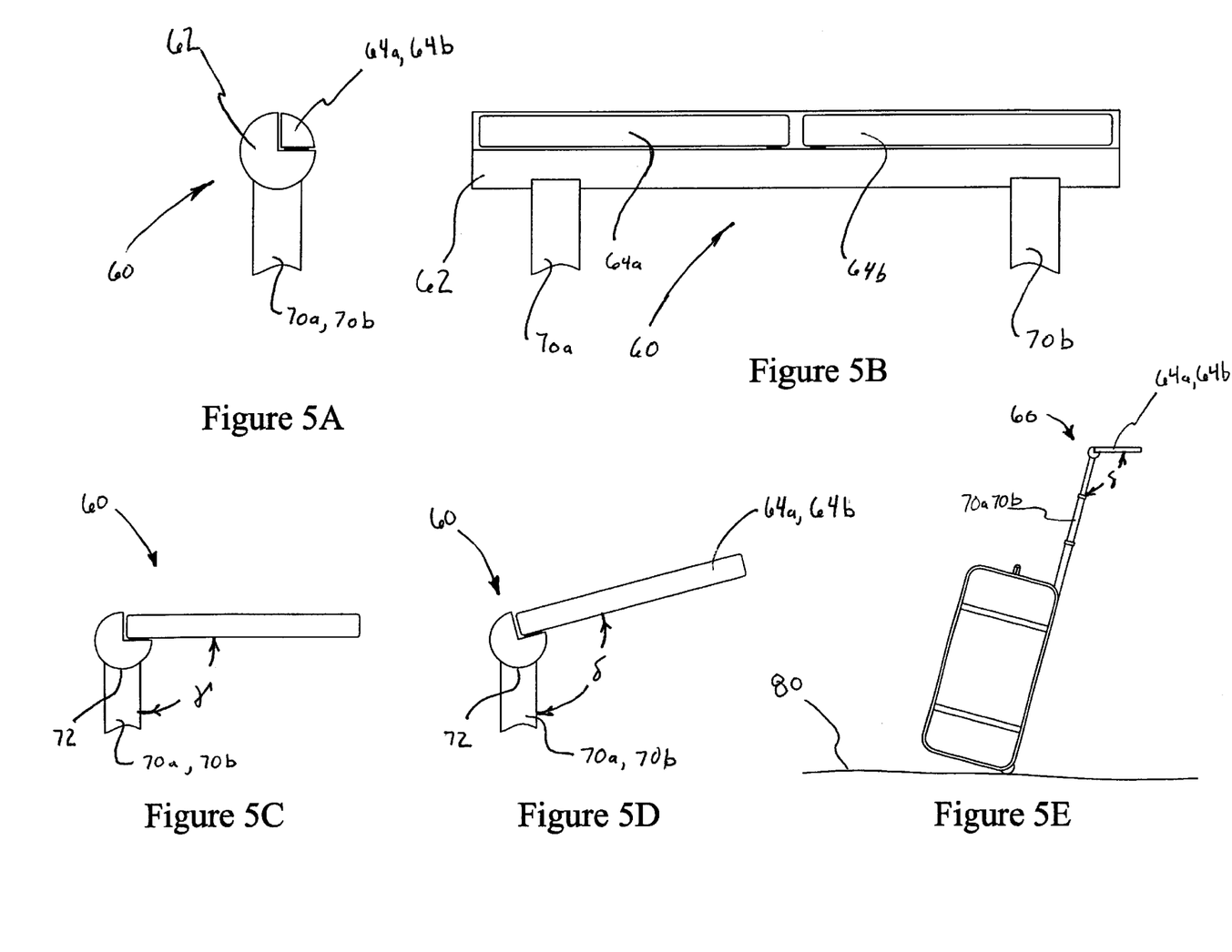
FIG. 5A is a schematic side view drawing of a convertible handle assembly in accordance with another preferred embodiment of the present invention with the handle in the retracted position.
FIG. 5B is a schematic front view drawing of the handle of FIG. 5A.
FIG. 5C is a schematic side view of the handle of FIG. 5A wherein the handle is in an extended or forward-facing position.
FIG. 5D is a schematic side view of the handle of FIG. 5A wherein the handle is in another extended or forward-facing position.
FIG. 5E is a side view drawing of the convertible handle assembly of FIG. 5D attached to a wheeled suitcase.
Figure 6A:
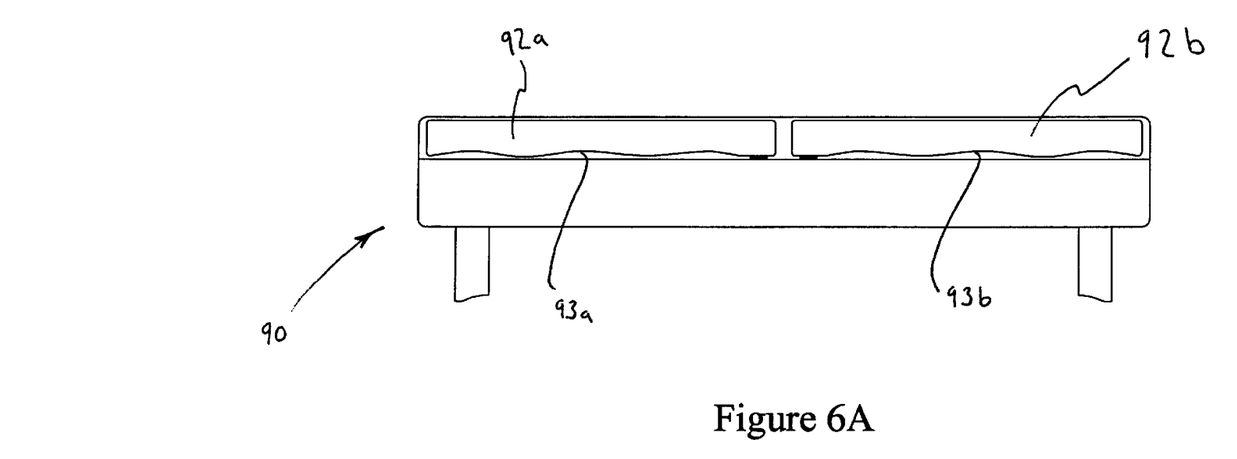
FIG. 6A is a schematic front view similar to FIG. 2B showing an alternative preferred embodiment of the present invention in which the convertible handle includes ergonomic handle extensions, wherein the extensions are in a nested position.
Figure 6B:
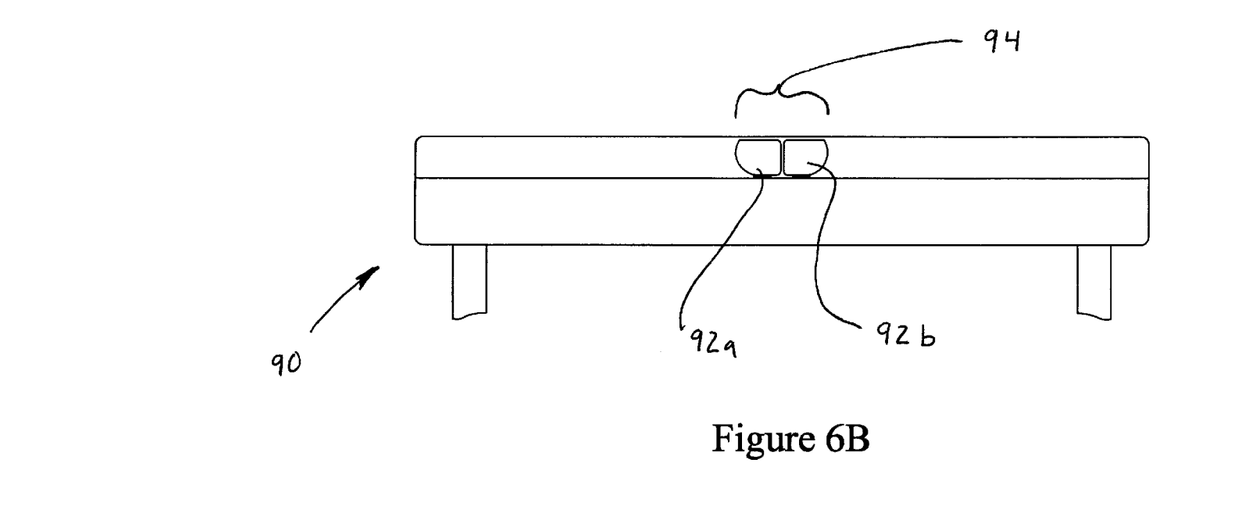
FIG. 6B is a schematic front view of the convertible handle with ergonomic handle extensions of FIG. 6A, wherein the extensions are in an extended position. While a preferred embodiment of the invention is shown and described, modifications thereof can be made by one skilled in the art without departing from the spirit of the invention.

Referring now to FIGS. 5A–E, an alternative embodiment to the handles 18, 50 of FIGS. 1–4 is shown. Alternative handle 60 is constructed with a substantially circular main body 62 from which two extensions 64a, 64b extend. Handle 60 meets with mounts 70a, 70b at a curve of intersection 72. When extended, grips 64a, 64b form an angle γ with respect to mounts 70a, 70b as shown in FIG. 5C. Because main body 62 is round in cross-section, a slot and groove arrangement (not shown) may be employed to allow the position of grips 64a, 64b with respect to mounts 70a, 70b to change to a new angle δ as shown in FIG. 5D. The change from γ to δ enables the user to rotate grips 64a, 64b to an angle greater than 90° so as to enable the tilting of luggage cart 10 or wheeled suitcase 100 to the most desired position (preferably substantially parallel to the ground 80) according to the user's size and towing preferences while maintaining grips in a comfortable, forward-facing configuration as shown in FIG. 5E. This permits the user to adapt handle 60 to better suit or optimize their comfort.

FIGS. 6A–B shows an ergonomic handle 90 in accordance with another preferred embodiment of the present invention in retracted (FIG. 6A) and extended (FIG. 6B) positions. Handle 90 includes two contoured grip extensions 92a, 92b with grip contours, 93a, 93b respectively, that are extended together to form contoured secondary grip 94. Because contours 93a, 93b are shaped to fit the contours of the user's hands, extended secondary grip 94 will be more comfortable to the user for longer periods of use.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

What is claimed is:

1. A handle for a wheeled dolly having at least a pair of wheels and a rotation axis therebetween adapted to be rolled across a surface, the handle comprising:
    a main body, said main body defining a primary grip including a handle axis lying substantially parallel to the surface and substantially parallel to the rotation axis of the wheels;
    said main body having a recess, said recess adapted to receive at least one secondary grip, said secondary grip defining a grip axis;
    said secondary grip configured to pivot from a primary position within said recess to a secondary position substantially outside of said recess; and
    said grip axis lying substantially parallel to said handle axis and substantially parallel to the rotation axis of the wheels when said secondary grip is in said primary position, and being skewed with respect to said handle axis when said secondary grip is in said secondary position.

2. The handle of claim 1 wherein said grip axis is substantially perpendicular to said handle axis when said secondary grip is in said secondary position.

3. The handle of claim 1 wherein a swing angle is defined between said grip axis and said handle axis when said secondary grip is in said secondary position, said swing angle being variable from 0 to 180 degrees.

4. The handle of claim 1 wherein said secondary grip is nested within said recess of said main body when in said primary position.

5. The handle of claim 1 wherein said main body has a circular cross section.

6. The handle of claim 1 wherein the wheeled dolly includes a frame with said frame being connected to said main body at an angle of inclination, said angle of inclination defined by frame and said grip axis in said secondary position.

7. The handle of claim 6 wherein said angle of inclination is variable from 0 to 180 degrees.

8. A suitcase to be rolled across a surface, the suitcase having at least one pair of wheels defining a rotation axis therebetween, a collapsible handle frame, and a convertible pull handle connected to said collapsible frame, the convertible handle comprising:
    a main handle body defining a primary grip;
    said main handle body having an elongate recess, said recess extending generally parallel to the rotation axis and adapted to receive at least one secondary grip, said secondary grip defining a grip axis; and
    said secondary grip configured to pivot from a primary position within said recess to a secondary position outside of said recess, said secondary grip being skewed with respect to said rotation axis of said wheels when in said secondary position.

9. The suitcase of claim 8 wherein said main handle body includes a handle axis lying substantially parallel to the surface and parallel to the rotation axis and wherein said grip axis is substantially parallel to said handle axis when said secondary grip is in said primary position.

10. The suitcase of claim 9 wherein said grip axis is substantially perpendicular to said handle axis when said secondary grip is in said secondary position.

11. The suitcase of claim 8 wherein the handle is retractable into a second recess within the suitcase when the handle frame is collapsed.

12. A wheeled transporting apparatus for transporting a load, the apparatus comprising:
    at least one pair of wheels, said pair of wheels defining a rotation axis therebetween;
    a handle, said handle comprising a main body defining a primary grip, said main body having a recessed portion;
    a frame interconnecting said handle to said wheels, said frame configured to support the load upon said wheels;
    said recessed portion of said handle adapted to receive at least one secondary grip, said secondary grip defining a grip axis along its length; and
    said secondary grip pivotably attached to said main body of said handle and pivotable from a primary position within said recess to a secondary position substantially outside of said recess, said grip axis being not parallel to said rotation axis when said secondary grip is in said secondary position.

13. The transport apparatus of claim 12 wherein said main body defines a handle axis lying substantially parallel to a surface across which said wheels are to be rolled; and said grip axis lies substantially parallel to said handle axis when said secondary grip is in said primary position.

14. The wheeled transport apparatus of claim 13 wherein said grip axis lies substantially perpendicular to said handle axis when said secondary grip is in said secondary position.

15. A handle for a wheeled transporting apparatus, the handle comprising:
    a main body, said main body defining a primary grip including a handle axis lying substantially parallel to a surface across which the transporting apparatus is to be rolled;

a pair of secondary grips pivotably attached to said main body, each of said secondary grips configured to pivot from a primary position to a secondary position; and said secondary grips defining a grip axis that lies substantially parallel to said handle axis when said secondary grips are in said primary position.

16. The handle of claim 15 wherein said secondary grips extend substantially perpendicular to said handle axis when said secondary grips are in said secondary position.

17. The handle of claim 15 wherein said main body of said handle includes a recess and wherein said secondary grips are nested within said recess of said main body when in said primary position.

18. The handle of claim 15 wherein said pair of grips engage one another when in said secondary position.

19. The handle of claim 15 wherein the wheeled transporting apparatus includes a frame with said frame being connected to said main body at an angle of inclination, said angle of inclination defined by said frame and said secondary grips when in said secondary position.

20. The handle of claim 19 wherein said angle of inclination is variable from 0 to 180 degrees.

21. A wheeled transporting apparatus, the apparatus comprising:

a frame;

a pair of wheels connected to said frame, said wheels defining a rotation axis therebetween;

a handle connected to said frame. said handle spaced apart from said wheels;

said handle includes a body, said body defining a primary grip having a cutaway portion forming a recess in said body;

at least one secondary grip pivotally connected to said handle body, said secondary grip pivotable between a first position and a second position;

said first position nested within said recess, and substantially parallel to said wheel axis said second position substantially perpendicular to said wheel axis.

22. The wheeled transporting apparatus of claim 21 wherein the apparatus includes two secondary grips pivotally connected to said handle body, said secondary grips pivotable in opposite directions relative to one another.

23. The wheeled transporting apparatus of claim 22 wherein said two secondary grips engage one another when in said second position.

24. The wheeled transporting apparatus of claim 21 wherein detents within said handle body retains said secondary grips in said first position.

25. The wheeled transporting apparatus of claim 21 wherein detents within said secondary grip retains said secondary grips in said first position.

26. The wheeled transporting apparatus of claim 21 wherein detents within said handle body retains secondary grips in said second position.

27. A wheeled transporting apparatus, the apparatus comprising:

a frame;

a pair of wheels connected to said frame, said wheels defining a wheel axis therebetween;

a handle connected to said frame, said handle spaced apart from said wheels;

said handle including a body, said body having a cutaway portion forming a recess in said body;

two grips pivotally connected to said handle body, said grips pivotable in opposite directions relative to one another and pivotable between a first position and a second position;

said grips in said first position nested within said recess and extending substantially parallel to said wheel axis; and said grips in said second position engaging one another and extending substantially perpendicular to said wheel axis.

* * * * *